United States Patent Office 2,919,589
Patented Jan. 5, 1960

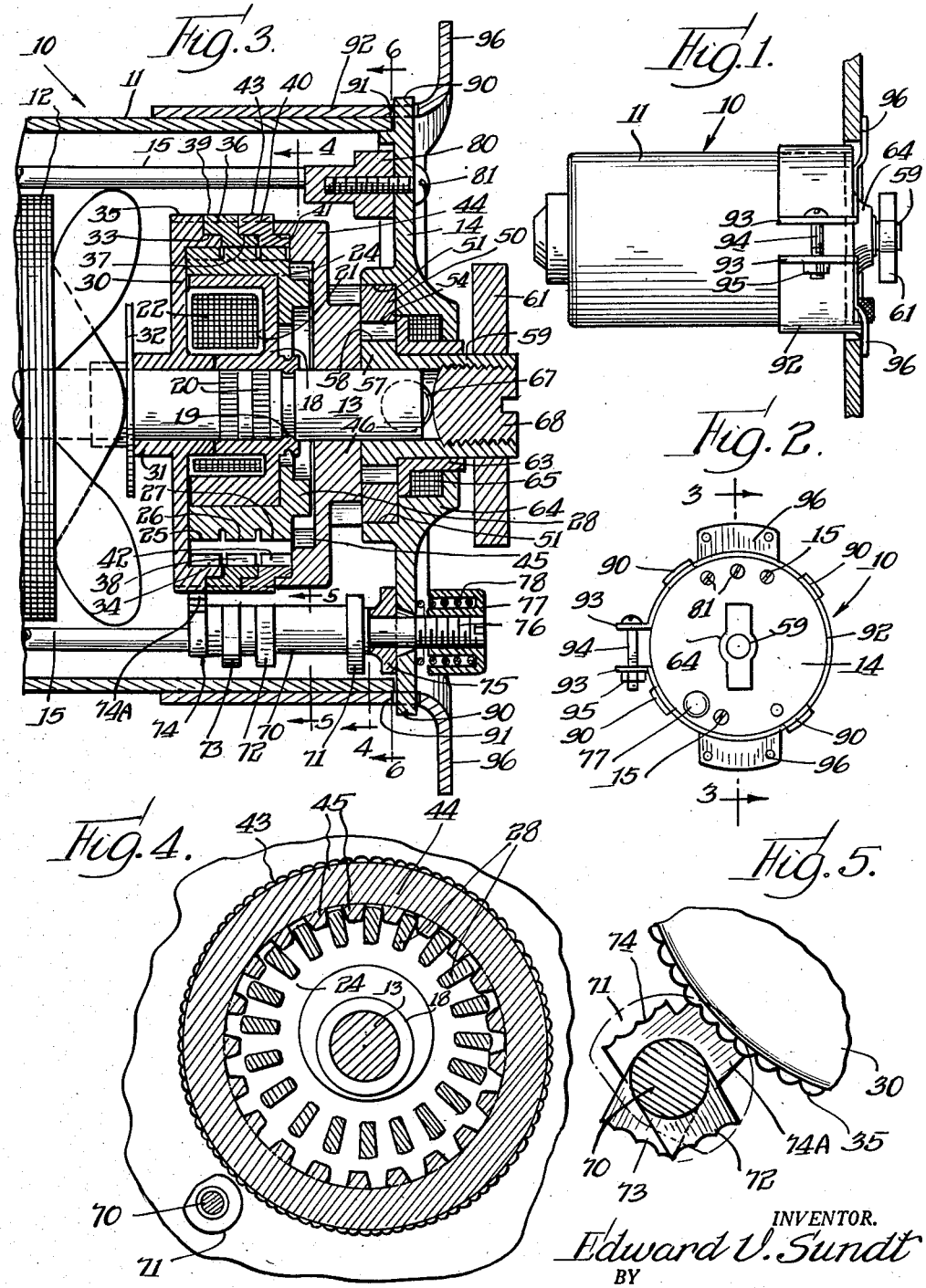

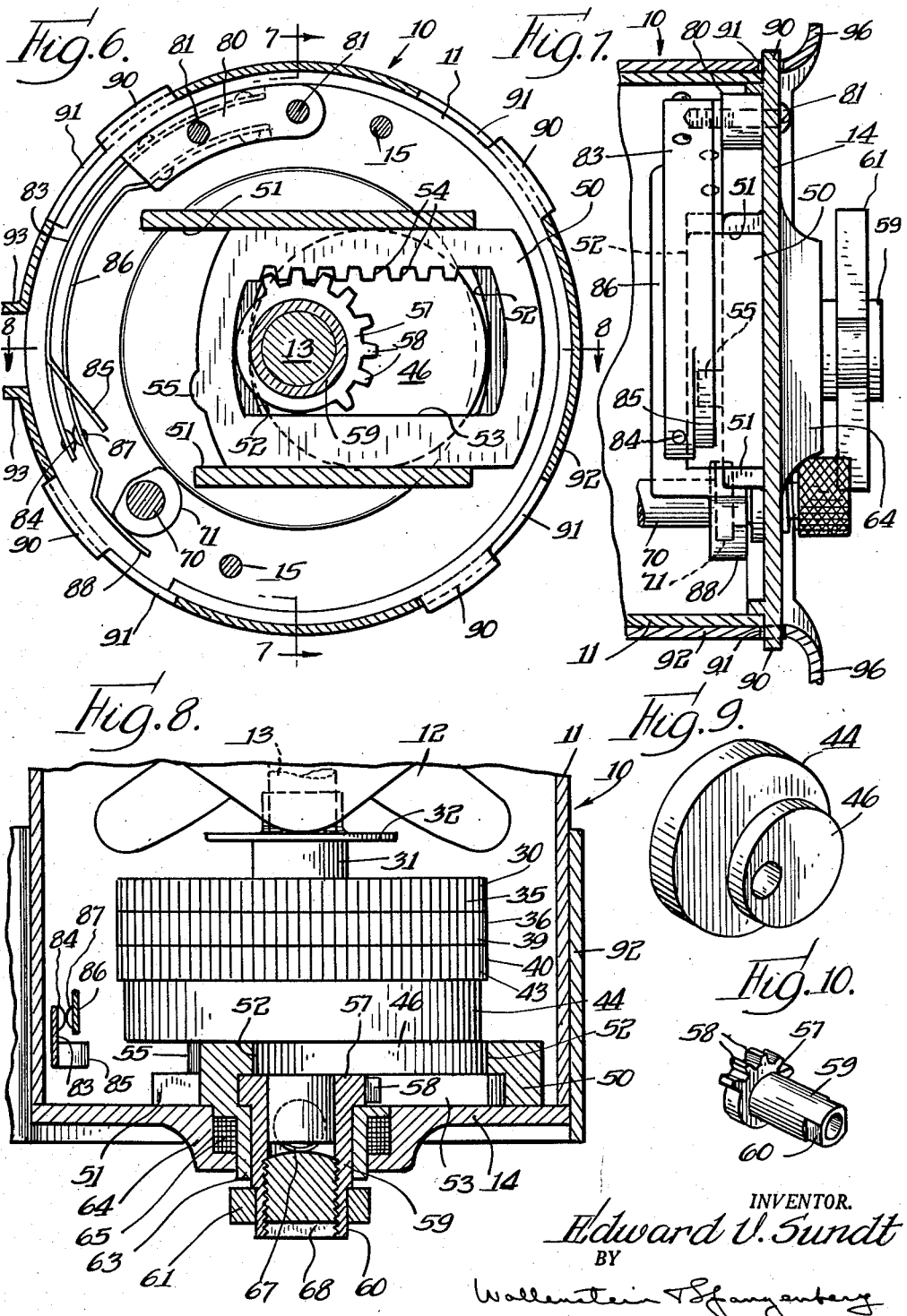

2,919,589

MULTIPLE SPEED DRIVING MECHANISM FOR WINDSHIELD WIPERS AND THE LIKE

Edward V. Sundt, Wilmette, Ill.

Application April 30, 1956, Serial No. 581,526

20 Claims. (Cl. 74—78)

This invention is directed to a multiple speed driving mechanism for windshield wipers and the like and this application is a continuation, in part, of my co-pending application Serial No. 547,130, filed November 16, 1955.

The principal object of this invention is to provide a multiple speed driving mechanism for windshield wipers and the like, which is simple in construction, foolproof in operation and inexpensive to manufacture and assemble, which is compact, small and light in weight, wherein two or more definite speeds of operation are provided, wherein the parts of the driving mechanism are symmetrically arranged about a central motor shaft axis, wherein the driving mechanism including its substantially cylindrical housing may be mounted on a bracket for adjustment about its central motor shaft axis for adjustably shifting the oscillating range of the windshield wipers and the like, wherein operation and speed selection are obtained from a single selector mechanism, wherein operation is always stopped with the wiper in an end position of its stroke, and wherein overload release protection is provided.

Briefly, the multiple speed driving mechanism of this invention for driving windshield wipers and the like includes an electric motor, a shaft rotated by the motor, and a multiple speed differential gear speed reducer means concentric with the shaft and rotated at selected reduced speeds thereby. It also includes a motion transmitting means concentric with the shaft and connected to the speed reducer means and including means for translating rotary motion of the speed reducer means to oscillatory motion through a fixed angle of oscillation, and forming oscillating driving means for driving the windshield wipers and the like at selected speeds of operation.

The multiple speed differential gear speed reducer means preferably includes an eccentric secured to the shaft for rotation therewith, a member rotatably mounted on the eccentric and oscillated thereby and having at least three rings of gear teeth arranged thereon, and at least three relatively rotatable toothed gears concentric with the shaft and meshing respectively with the rings of gear teeth on the member. The motion transmitting means preferably includes a second eccentric carried by one of the toothed gears, a slider reciprocated by the second eccentric and having a rack thereon, and a pinion rotatably mounted concentrically with the shaft and meshing with the rack and oscillated thereby through a fixed angle of oscillation and forming oscillating driving means for the windshield wipers and the like. The multiple speed driving mechanism also includes means for selectively securing the other toothed gears against rotation to selectively cause the same to react against the member to control the same and hence control the speed of rotation of said one gear and the speed of oscillation of the driving means.

The means for selectively securing the other toothed gears against rotation preferably includes resilient releasable means for releasing the selected gear member to allow the same to rotate when the load on the driving means becomes excessive. This effectively prevents stalling and undue loading of the motor. The multiple speed driving mechanism is also preferably enclosed within a substantially cylindrical housing which is concentrically arranged with respect to the motor shaft. A mounting bracket rotatably adjustably receives and supports the housing and provides for adjustment of the fixed angle of oscillation of the oscillating driving means with respect to the mounting bracket. Thus, the range of oscillation of the oscillating means may be shifted as desired without adjusting the internal parts of the driving mechanism.

Electrical means for starting and stopping the electric motor are also provided, and they include normally closed switch means for maintaining the electric motor in operation, and means on the slider engaging the switch means for opening the same when the slider reaches an end position for continuing motor operation until the oscillating driving means is oscillated to one end of the fixed angle of oscillation and then stopping the motor. Manually operative means are also provided for shifting the switch means out of the path of the movement of the slider for continuously maintaining the switch means closed to maintain the motor in continuous operation for as long as desired. This manually operated means may also form a part of the means which selectively secures said other toothed gears against rotation for selecting the desired speed of operation. When the manually operative means is manipulated to stop operation of the motor, the motor, however, continues in operation until such time as the wiper or the like has been moved to an end position in its stroke.

Other objects of this invention reside in the details of construction of the multiple speed driving mechanism and in the co-operative relationships between the component parts thereof.

Further objects and advantages of this invention will become apparent to those skilled in the art upon reference to the accompanying specification, claims and drawings, in which:

Fig. 1 is a side elevational view of the multiple speed driving mechanism of this invention.

Fig. 2 is an end elevational view of the multiple speed driving mechanism looking from the right of Fig. 1.

Fig. 3 is an enlarged vertical sectional view taken substantially along the line 3—3 of Fig. 2.

Fig. 4 is an enlarged sectional view taken substantially along the line 4—4 of Fig. 3.

Fig. 5 is a partial view of the lower portion of Fig. 3 and looking from the line 5—5 of Fig. 3.

Fig. 6 is a vertical sectional view taken substantially along the line 6—6 of Fig. 3.

Fig. 7 is a vertical sectional view taken substantially along the line 7—7 of Fig. 6.

Fig. 8 is a horizontal sectional view taken substantially along the line 8—8 of Fig. 6.

Fig. 9 is a perspective view of the driving gear and second eccentric carried thereby.

Fig. 10 is a perspective view of the oscillating pinion driven by the slider.

Referring to the drawings and more particularly to Figs. 1 to 8, the multiple speed driving mechanism of this invention for driving windshield wipers and the like, is generally designated at 10, and it includes an electric motor having a substantially cylindrical housing 11, and a motor structure 12, for rotating a shaft 13. The electric motor is of conventional construction and is driven by the electrical system of the automotive vehicle, and, for example, will operate to rotate the shaft 13 at substantially 3,000 r.p.m. The multiple speed driving mechanism, which is operated by the electric motor, is arranged concentrically about the extending shaft 13 and it is enclosed within the substantially cylindrical housing 11. An end plate 14 is secured to the end of the housing 11 and is preferably held in place by means of assembly screws 15.

The multiple speed driving mechanism, which also operates as a speed reducer, includes an eccentric 18 which is pressed fit on the motor shaft 13, the eccentric being staked in place as indicated at 19. Suitable serrations 20 on the shaft 13 co-operate with the eccentric 18 for securing the same in place thereon. The eccentric 18 is preferably formed of powdered iron or the like and is provided with an internal annular recess 21 for receiving a lubricant impregnated wick 22. The lubricant from the wick 22 penetrates through the eccentric 18 for lubricating purposes. A member 24 is rotatably mounted on the eccentric 18 so as to be oscillated thereby and preferably this member 24 is formed of nylon, Teflon or the like. The member 24 also overhangs the side of the eccentric 18 and on its outer periphery the member is provided with three concentrically arranged rings of gear teeth 25, 26 and 27, respectively, the teeth extending radially outwardly. The overhanging portion of the member 24 is also provided with a ring of gear teeth 28, these gear teeth also extending radially outwardly.

A first gear 30 having a hub 31 is rotatably mounted on the shaft 13 adjacent the eccentric 18 and member 24 and it is held in place on the shaft 13 by a flanged collar 32 pressed fit onto the shaft 13. This collar 32 may be formed of nylon or the like. The gear 30 is provided with an outwardly facing shoulder 33 and is provided with inwardly radially extending teeth 34, which mesh with the ring of gear teeth 25 on the member 18. On its outer periphery, the gear 30 is also provided with rounded teeth 35. A second gear 36, concentric with the shaft 13, is rotatably nestably mounted on the shoulder 33 of the first gear 30, and it is provided with an annular shoulder 37, inwardly radially extending teeth 38 meshing with the ring of gear teeth 26 on the member 18, and with rounded teeth 39 on the periphery thereof. A third gear 40 is rotatably mounted concentric with the shaft 13 on the shoulder 37 of the gear 36 and it, in turn, is provided with a shoulder 41, radially inwardly extending teeth 42 meshing with the ring of gear teeth 27 on the member 28, and external rounded teeth 43. A fourth gear 44 which is the driving gear, is rotatably mounted on the shaft 13 and receives the shoulder 41 on the gear 40. This fourth gear 44 is internally provided with inwardly radially extending teeth 45 which mesh with the ring of gear teeth 28 on the member 24. The gear 44 is also provided with an eccentric 46 which is hereinafter termed the second eccentric. The gears 30, 36, 40 and 44, which are all relatively rotatable and concentrically arranged around the shaft 13, are nested one within the other and operate to enclose the eccentric 18 and the member 24. They are preferably formed of molded powdered iron or the like and are preferably impregnated with a suitable lubricant for lubricating the running surfaces therebetween.

Located adjacent the second eccentric 46 is a slider 50 which is guided for reciprocation in guides 51 formed in the end plate 14. This slider 50, which may be formed of nylon or the like, is provided with a pair of projections 52 which are arranged on opposite sides of the second eccentric 46, so that as the eccentric 46 is rotated, the slider 50 is reciprocated in the guides 51. The slider 50 is provided with a central substantially rectangular shaped opening 53 along the upper edge of which is formed a toothed rack 54. One end of the slider 50 is provided with an ear 55.

A pinion 57 is provided throughout a portion of its circumference with teeth 58 meshing with the toothed rack 54 of the slider 50. This pinion 57 is provided with a sleeve hub 59 which rotatably receives the end of the motor shaft 13. The outer end of the sleeve hub 59 is provided with flattened surfaces 60 for receiving an arm 61, which may be utilized for driving the windshield wipers or the like. The sleeve hub 59 is rotatably mounted in a bearing member 63 secured within a boss 64 on the end plate 14. The space between the boss 64 and the bearing member 63 is preferably filled with a lubricant impregnated wick 65. This wick 65 supplies lubricant to the bearing member 63 which is preferably formed of porous bronze or the like for lubricating the surface between the bearing member 63 and the sleeve hub 59. The sleeve hub 59 and pinion 57 are preferably formed of powdered iron which is impregnated with a lubricant also so as to provide adequate lubrication for the running surfaces. The sleeve hub 59 being journalled for rotation in the bearing member 63, and also receiving the end of the shaft 13, acts as an outboard bearing support for the shaft 13. The outer end of the shaft 13 carries a ball 67 and a plug 68, screwthreaded into the sleeve hub 59, engages the ball 67, to form an end thrust member for the shaft 13.

As the driving gear 44 is rotated, the eccentric 46 thereon operates to reciprocate the slider 50, which, in turn, through its rack 54, operates to oscillate the pinion 57 through a fixed angle of oscillation, the pinion 57 forming driving means for the windshield wipers and the like for oscillating the same through a fixed angle of oscillation. Preferably, the slider 50 and the pinion 57, are so arranged as to provide oscillating movement of the pinion 57 through substantially 120° of angular oscillation.

To provide for different speeds of operation of the unit, the gears 30, 36, and 40 are selectively secured against rotation so as to react against the member 24. This selective securing is accomplished by a selector mechanism which includes a shaft 70 which, in turn, is provided with a cam 71, and four radially disposed arms 72, 73, 74 and 74A. These arms are provided with pointed teeth which are adapted to mesh with the rounded teeth 43, 39, and 35, respectively, on the respective gears 40, 36, and 30. When the teeth on the arm 72 mesh with the rounded teeth 43, the gear member 40 is secured against rotation. Likewise, when the teeth on the arm 73 mesh with the rounded teeth 39 on the gear 36, the gear 36 is secured against rotation, and when the teeth on the arms 74 and 74A mesh with the rounded teeth 35, on the gear 30, the gear 30 is secured against rotation. Thus, dependent upon the rotative position of the shaft 70, one or the other of the gears 40, 36, and 30, are secured against rotation.

A shouldered sleeve 75 is arranged about the shaft 70 and is interposed between the cam 71 and a flat surface on the end plate 14, and this sleeve operates to resiliently hold the shaft 70 normal to the flat surface of the end plate 15, with the teeth on the arms 72, 73, 74 or 74A, in mesh with the rounded teeth 43, 39 or 35 respectively. The shaft 70 is provided with a screw-threaded extension 76, which extends through a tapered hole in the end plate 15. A knob 77 is screwthreaded on to the extension 76 and it may be secured in place thereon by swedging a portion of the knob into a slot in the end of the extension 76. In this way the knob 77 is secured against rotation on the shaft extension 76. Interposed between the knob 77 and the outer surface of the end plate 15, is a spring 78 which operates to resiliently hold the sleeve 75 against the inner flat surface of the end plate 15, in turn to resiliently hold the shaft 70 in a normal position with the teeth of the arms engaging the selected rounded teeth on the gears.

When the shaft 70 is rotated by the knob 77, to shift from one position, for example where the teeth on the arm 74 engage the rounded teeth 35 to a position where the teeth on the arm 73 engage the rounded teeth 39, the shaft 70 is allowed to tilt in the tapered hole in the end plate to permit this selective turning. It is noted that the curvatures of the teeth on the arms 72, 73, 74 and 74A, correspond generally to the curvatures of the teeth 43, 39 and 35, respectively, so that the arms, when moved into engagement with the respective gears are maintained in that position for securing the respective gears against rotation. If, however, the load on the driving means 61 should become excessive so as to produce a large reactive turning force on the gear which is held against rotation, this excessive reactive turning force will cause the shaft 70 to pivot in the tapered hole in the cover plate 14 and rotate to a position to release the gear member which had been secured thereby against rotation. Thus, the selector mechanism which selectively secures the gears 30, 36 and 40 against rotation, includes resilient releasable means to allow the same to rotate in the event that the load upon the driving means becomes excessive. This effectively prevents stalling and burning out of the electric motor upon the occurrence of excessive loads upon the driving mechanism.

For purposes of describing the operation of the multiple speed driving mechanism of this invention, it is assumed that the shaft 13 is driven at a substantially constant speed of 3,000 r.p.m. when the electric motor is operating, and also that the numbers of teeth in the rings of gear teeth on the member 24 and on the gears 30, 36, 40 and 44, are as follows: The ring 25 of gear teeth on the member 24 contains 52 teeth and the number of meshing teeth on the gear 30 is 53 teeth. The ring 26 of gear teeth contains 28 teeth and the gear 36 contains 29 teeth meshing therewith. The ring 27 of gear teeth contains 23 teeth and the teeth 42 on the gear 40 meshing therewith is 24 in number. The ring 28 of gear teeth consists of 20 teeth and the gear 44 has 21 teeth meshing therewith.

Assuming that the arm 74 on the selector mechanism is rotated to the position to secure the gear 30 against rotation, that gear becomes the reaction gear for the member 23 and since the gear 30, having 53 teeth, has one tooth more than the ring 25 of gear teeth, which has 52 teeth, there is a tooth difference of one tooth which causes the member 24 to turn on its axis at the rate of $$\frac{3,000}{53} = 57 \text{ r.p.m.}$$

in the countershaftwise direction. This rotation of the member 24 is imparted to the gear 44 through the meshing of the gear teeth 45 and 28. Since the ring 28 of gear teeth has 20 teeth, and since there are 21 teeth on the gear 44, this relation of gear teeth causes the gear 44 to rotate in a shaftwise direction with respect to the member 24 at the rate of $$\frac{3,000}{21} = 143 \text{ r.p.m.}$$

Since the rotation caused by the intermeshing of the gear 44 and the member 24 is greater than the rotation caused by the intermeshing of the gear 30 and the member 24, the resultant speed at which the gear 44 is driven under these conditions is 143 r.p.m.—57 r.p.m.=86 r.p.m. in the shaftwise direction. Thus, when the selector mechanism is manipulated to cause the arm 74 to secure the gear 30 against rotation, the gear 44 is driven at a speed of 86 r.p.m. in a shaftwise direction to cause the driving means 61 to oscillate at a corresponding speed, namely, 86 oscillations per minute.

If, now, the selector mechanism is manipulated to cause the toothed arms 73 thereof to engage and secure the gear 36 against rotation, the gear 44 and the driving means oscillated thereby are driven at a different speed. In this connection, the ring 26 of gear teeth includes 28 teeth and the meshing gear 36 has 29 teeth. Thus, the member 24 is driven in a countershaftwise direction at a rate of $$\frac{3,000}{29} = 104 \text{ r.p.m.}$$

When this rotation is subtracted from the rotation of 143 r.p.m. brought about by the intermeshing of the gear 44 and the member 24, the resultant speed of rotation of the gear 44 is 143 r.p.m.—104 r.p.m.=39 r.p.m. in the shaftwise direction. Thus, when the selector mechanism is manipulated to secure the gear 36 against rotation, the driving means 61 is oscillated in the same manner as before, but at 39 oscillations per minute rather than the 86 oscillations per minute.

When the selector mechanism is manipulated to cause the toothed arm 72 to engage and secure the gear 40 against rotation so as to react against the member 24, the gear 24 and the driving means oscillated thereby are driven at still a different speed. In this connection the ring 27 of gear teeth includes 23 teeth and the meshing gear 40 has 24 teeth. Thus, the member 24 is driven in a countershaftwise direction at a rate of $$\frac{3,000}{24} = 125 \text{ r.p.m.}$$

When this rotation is subtracted from the rotation of 143 r.p.m. brought about by the intermeshing of the gear 44 and the member 24, the resultant speed of rotation of the gear 44 is 143 r.p.m.—125 r.p.m.=18 r.p.m. in the shaftwise direction. Thus, when the selector mechanism is manipulated to secure the gear 40 against rotation, the driving means 61 is oscillated in the same manner as before, but at 18 oscillations per minute rather than 39 or 86 oscillations per minute.

Accordingly, with the particular embodiment here described, it is possible by manipulating the selector mechanism to selectively obtain speeds of oscillation of the driving means of 86 oscillations per minute, 39 oscillations per minute, and 18 oscillations per minute with the rotating shaft 13 rotating in the same direction at substantially 3,000 r.p.m. By selecting different numbers of gear teeth on the various gears and member, various speeds of rotation of the gear 44, and hence various speeds of oscillation of the driving means, may be selectively obtained. The toothed design of the various teeth may be conventional to provided efficient and quite operation.

The operation of the electric motor, that is, the starting and stopping of it, is controlled by a switch means included in the electric connections to the electric motor, which switch means is controlled primarily by the cam 71 on the speed selector mechanism. Provision is here made that when the selector mechanism is operated to stop operation of the electric motor, the electric motor is continued in operation until the driving mechanism is operated to an end position, for example, a position wherein the windshield wipers are moved to an end or clear position. In this connection, the switch means includes a block 80, formed of electrical insulating material such as Bakelite or the like, which is secured to the inside of the end plate 14 by means of screws 81. Secured to the block 80 is one end of a resilient spring arm 83, the other end of which carries a contact 84. This spring arm 83 is also provided with an inwardly projecting finger 85. The block 80 also carries another resilient spring arm 86 which carries a contact 87 adapted to engage the contact 84 and this spring arm 86 is provided with an extension 88 adapted to engage the cam 71 of the speed selector mechanism. The spring arms 83 and 86 are formed from resilient electrical conducting material such as phosphor bronze or the like, and they are so formed as to cause the contacts 84 and 87 to normally engage each other. The spring arms 83 and 86 and the contacts 84 and 87 are connected in series in the electrical circuit leading to the electric motor so that when the contacts 84 and 87 are engaging each other, the motor operates and when they are separated the motor stops.

When the speed selector mechanism is positioned so as to have any one of the arms 72, 73, and 74 engaging their respective gear members, the high dwell of the cam 71 engages the extension 88 on the spring arm 86 for maintaining the contacts 84 and 87 in engagement and for maintaining the finger 85 of the spring arm 83 out of the path of reciprocating movement of the ear 55 on the slider 50. Thus, in these three positions of the selector mechanism, the electric motor operates continuously. When however, the speed selector mechanism is moved to a position wherein the low dwell of the cam 71 is engaged by the extension 88 on the spring arm 86, the spring arm 86 moves inwardly and this inward movement is followed by the spring arm 83 so that the contacts 84 and 87 remain in engagement to continue operation of the electric motor. It is here noted that when the speed selector mechanism is moved to this position, the position for initiating stopping of the electric motor, the arm 74A engages the rounded teeth 35 on the gear 30 to secure the same against rotation in the same manner as the arm 74 and as a result the driving mechanism is positively operated while the electric motor is running. The electric motor continues to operate until such time as the slider 50 moves to an end position and when this occurs the ear 55 on the slider 50 engages the finger 85 on the spring member 83 to move the contact 84 out of engagement with the contact 87. This interrupts the energization of the electric motor and stops the same so that the unit stops in the end position where the windshield wipers are in an end or clear position. When it is desired to restart the unit, the selector mechanism is moved to the desired speed position and the cam 71 is correspondingly moved to cause the contact 87 to engage the contact 84 to restart operation of the electric motor. Accordingly, the speed selector mechanism, in addition to controlling the speed at which the unit operates, also controls the starting and stopping of the unit and when the selector mechanism is moved to a position to stop operation of the unit, the unit continues to operate until it reaches an end position at which time it is automatically stopped.

As noted above, all of the parts of the driving mechanism are arranged concentrically about the axis of the motor shaft 13 and all of the parts are enclosed within a substantially cylindrical housing 11. To shift the range of oscillation of the pinion 57 and the wipers driven thereby, all that is necessary is to adjustably position the entire drive mechanism about the motor shaft axis. This is effectively accomplished by the same means which mounts the driving mechanism. Toward this end, the end plate 14 is provided with a plurality of projections 90 which extend through slots 91 in a strap-type mounting bracket 92. The mounting bracket is provided with a pair of mounting ears 96 which have holes therein for mounting the same to any desired support. Thus, it is seen that the drive mechanism and its housing 11 may be rotatively positioned with respect to the mounting bracket 92, the extent of rotatable adjustment being determined by the extent of the slots 91. When the drive mechanism is arranged in its proper adjusted position, it is clamped in that position by tightening the screw and nut 94 and 95 extending through ears 93 on the ends of the strap-like bracket 92.

While for purposes of illustration one form of this invention has been disclosed, other forms thereof may become apparent to those skilled in the art upon reference to this disclosure and, therefore, this invention is to be limited only by the scope of the appended claims.

I claim as my invention:

1. A multiple speed driving mechanism for windshield wipers and the like comprising, an electric motor, a shaft rotated by the motor, an eccentric secured to the shaft for rotation therewith, a member rotatably mounted on the eccentric and oscillated thereby and having at least three rings of gear teeth arranged thereon, at least three relatively rotatable toothed gears concentric with the shaft and meshing respectively with the rings of gear teeth on the member, a second eccentric carried by one of the toothed gears, a slider reciprocated by the second eccentric and having a rack thereon, a pinion rotatably mounted concentrically with the shaft and meshing with the rack and oscillated thereby through a fixed angle of oscillation and forming oscillating driving means for the windshield wipers and the like, and means for selectively securing the other toothed gears against rotation to selectively cause the same to react against the member to control the same and hence control the speed of rotation of said one gear and the speed of oscillation of the driving means.

2. A multiple speed driving mechanism for windshield wipers and the like comprising, an electric motor, a shaft rotated by the motor, an eccentric secured to the shaft for rotation therewith, a member rotatably mounted on the eccenric and oscillated thereby and having at least three rings of gear teeth arranged thereon, at least three relatively rotatable toothed gears concentric with the shaft and meshing respectively with the rings of gear teeth on the member, motion transmitting means concentric with the shaft and connected to one of the toothed gears and including means for translating rotary motion of said toothed gear to oscillating motion through a fixed angle of oscillation and forming oscillating driving means for the windshield wipers and the like, and means for selectively securing the other toothed gears against rotation to selectively cause the other toothed gears to react against the member to control the same and hence control the speed of rotation of said one gear and the speed of oscillation of the driving means.

3. A multiple speed driving mechanism for windshield wipers and the like comprising, an electric motor, a shaft rotated by the motor, a multiple speed differential gear speed reducer means concentric with the shaft and including an output member rotated at selected reduced speeds thereby, motion transmitting means concentric with the shaft and connected to the output member of the speed reducer means and including an oscillating member concentric with the shaft and means for translating rotary motion of the speed reducer means to oscilatory motion of the oscillating member through a fixed angle of oscillation about said shaft and forming oscillating driving means for driving the windshield wipers and the like at selected speeds of operation.

4. A multiple speed driving mechanism for windshield wipers and the like comprising, an electric motor, a shaft rotated by the motor, an eccentric secured to the shaft for rotation therewith, a member rotatably mounted on the eccentric and oscillated thereby and having at least three rings of radially outwardly extending gear teeth arranged thereon, at least three relatively rotatable toothed gears concentric with the shaft and having radially inwardly extending teeth meshing respectively with the rings of gear teeth on the member, one of said toothed gears being rotatably mounted on the shaft and carrying a second eccentric, a slider reciprocated by the second eccentric and having a rack thereon, a rotatably mounted pinion concentrically receiving the shaft and meshing with the rack and oscillated thereby through a fixed angle of oscillation and forming oscillating driving means for the windshield wipers and the like, and means for selectively securing the other toothed gears against rotation to selectively cause the same to react against the member to control the same and hence control the speed of rotation of said one gear and the speed of oscillation of the driving means.

5. A multiple speed driving mechanism for windshield wipers and the like comprising, an electric motor, a shaft rotated by the motor, an eccentric secured to the shaft for rotation therewith, a member rotatably mounted on the eccentric and oscillated thereby and having at least three rings of radially outwardly extending gear teeth arranged thereon, at least three relatively rotatable toothed gears concentric with the shaft and having radially inwardly extending teeth meshing respectively with the rings of gear teeth on the member, one of said toothed gears being rotatably mounted on the shaft, motion transmitting means concentric with the shaft and connected to said one of the toothed gears and including means for translating rotary motion of said toothed gear to oscillating motion through a fixed angle of oscillation and forming oscillating driving means for the windshield wipers and the like, and means for selectively securing the other toothed gears against rotation to selectively cause the other toothed gears to react against the member to control the same and hence control the speed of rotation of said one gear and the speed of oscillation of the driving means.

6. A multiple speed driving mechanism for windshield wipers and the like comprising, an electric motor, a shaft rotated by the motor, an eccentric secured to the shaft for rotation therewith, a member rotatably mounted on the eccentric and oscillated thereby and having at least three rings of radially outwardly extending gear teeth arranged thereon, at least three relatively rotatable toothed gears concentric with the shaft and having radially inwardly extending teeth meshing respectively with rings of gear teeth on the member, one of said toothed gears being rotatably mounted on the shaft and carrying a second eccentric, a slider reciprocated by the second eccentric and having a rack thereon, a pinion having a sleeve hub rotatably mounted on the shaft and meshing with the rack and oscillated thereby through a fixed angle of oscillation and forming oscillating driving means for the windshield wipers and the like, a bearing support for the sleeve hub of the pinion to support the same and also to provide an outboard bearing support for the shaft journalled in said sleeve hub, and means for selectively securing the other toothed gears against rotation to selectively cause the same to react against the member to control the same and hence control the speed of rotation of said one gear and the speed of oscillation of the driving means.

7. A multiple speed driving mechanism for windshield wipers and the like comprising, an electric motor, a shaft rotated by the motor, an eccentric secured to the shaft for rotation therewith, a member rotatably mounted on the eccentric and oscillated thereby and having at least three rings of gear teeth arranged thereon, at least three relatively rotatable toothed gears concentric with the shaft and meshing respectively with the rings of gear teeth on the member, a second eccentric carried by one of the toothed gears, a slider reciprocated by the second eccentric and having a rack thereon, a pinion having a sleeve hub rotatably mounted on the shaft and meshing with the rack and oscillated thereby through a fixed angle of oscillation and forming oscillating driving means for the windshield wipers and the like, a bearing support for the sleeve hub of the pinion to support the same and also to provide an outboard bearing support for the shaft journaled in said sleeve hub, and means for selectively securing the other toothed gears against rotation to selectively cause the same to react against the member to control the same and hence control the speed of rotation of said one gear and the speed of oscillation of the driving means.

8. A multiple speed driving mechanism for windshield wipers and the like comprising, an electric motor, a shaft rotated by the motor, an eccentric secured to the shaft for rotation therewith, a member rotatably mounted on the eccentric and oscillated thereby and having at least three rings of gear teeth arranged thereon, at least three relatively rotatable toothed gears concentric with the shaft and meshing respectively with the rings of gear teeth on the member, a second eccentric carried by one of the toothed gears, a slider reciprocated by the second eccentric and having a rack thereon, a pinion rotatably mounted concentrically with the shaft and meshing with the rack and oscillated thereby through a fixed angle of oscillation and forming oscillating driving means for the windshield wipers and the like, and means for selectively securing the other toothed gears against rotation to selectively cause the same to react against the member to control the same and hence control the speed of rotation of said one gear and the speed of oscillation of the driving means, said last mentioned means including resilient releasable means for releasing the selected gear member to allow the same to rotate when the load on the driving means becomes excessive.

9. A multiple speed driving mechanism for windshield wipers and the like comprising, an electric motor, a shaft rotated by the motor, an eccentric secured to the shaft for rotation therewith, a member rotatably mounted on the eccentric and oscillated thereby and having at least three rings of gear teeth arranged thereon, at least three relatively rotatable toothed gears concentric with the shaft and meshing respectively with the rings of gear teeth on the member, motion transmitting means concentric with the shaft and connected to one of the toothed gears and including means for translating rotary motion of said toothed gear to oscillating motion through a fixed angle of oscillation and forming oscillating driving means for the windshield wipers and the like, and means for selectively securing the other toothed gears against rotation to selectively cause the other toothed gears to react against the member to control the same and hence control the speed of rotation of said one gear and the speed of oscillation of the driving means, said last mentioned means including resilient releasable means for releasing the selected gear member to allow the same to rotate when the load on the driving means becomes excessive.

10. A multiple speed driving mechanism for windshield wipers and the like comprising, an electric motor, a shaft rotated by the motor, an eccentric secured to the shaft for rotation therewith, a member rotatably mounted on the eccentric and oscillated thereby and having at least three rings of gear teeth arranged thereon, at least three relatively rotatable toothed gears concentric with the shaft and meshing respectively with the rings of gear teeth on the member, a second eccentric carried by one of the toothed gears, a slider reciprocated by the second eccentric and having a rack thereon, a pinion rotatably mounted concentrically with the shaft and meshing with the rack and oscillated thereby through a fixed angle of oscillation and forming oscillating driving means for the windshield wipers and the like, and means for selectively securing the other toothed gears against rotation to selectively cause the same to react against the member to control the same and hence control the speed of rotation of said one gear and the speed of oscillation of the driving means, a substantially cylindrical housing for the driving mechanism and concentrically arranged with respect to the shaft thereof, and a mounting bracket rotatably adjustably receiving and supporting the housing and providing for adjustment of the fixed angle of oscillation of the oscillating driving means with respect to the mounting bracket.

11. A multiple speed driving mechanism for windshield wipers and the like comprising, an electric motor, a shaft rotated by the motor, an eccentric secured to the shaft for rotation therewith, a member rotatably mounted on the eccentric and oscillated thereby and having at least three rings of gear teeth arranged thereon, at least three relatively rotatable toothed gears concentric with the shaft and meshing respectively with the rings of gear teeth on the member, motion transmitting means concentric with the shaft and connected to one of the toothed gears and including means for translating rotary motion of said toothed gear to oscillating motion through a fixed angle of oscillation and forming oscillating driving means for the windshield wipers and the like, and means for selectively securing the other toothed gears against rotation to selectively cause the other toothed gears to react against the member to control the same and hence control the speed of rotation of said one gear and the speed of oscillation of the driving means, a substantially cylindrical housing for the driving mechanism and concentrically arranged with respect to the shaft thereof, and a mounting bracket rotatably adjustably receiving and supporting the housing and providing for adjustment of the fixed angle of oscillation of the oscillating driving means with respect to the mounting bracket.

12. A multiple speed driving mechanism for windshield wipers and the like comprising, an electric motor, a shaft rotated by the motor, a multiple speed differential gear speed reducer means concentric with the shaft and including an output member rotated at selected reduced speeds thereby, motion transmitting means concentric with the shaft and connected to the output member of the speed reducer means and including means for translating rotary motion of the speed reducer means to oscillatory motion through a fixed angle of oscillation and forming oscillating driving means for driving the windshield wipers and the like at selected speeds of operation, a substantially cylindrical housing for the driving mechanism and concentrically arranged with respect to the shaft thereof, and a mounting bracket rotatably adjustably receiving and supporting the housing and providing for adjustment of the fixed angle of oscillation of the oscillating driving means with respect to the mounting bracket.

13. A multiple speed driving mechanism for windshield wipers and the like comprising, an electric motor, a shaft rotated by the motor, an eccentric secured to the shaft for rotation therewith, a member rotatably mounted on the eccentric and oscillated thereby and having at least three rings of gear teeth arranged thereon, at least three relatively rotatable toothed gears concentric with the shaft and meshing respectively with the rings of gear teeth on the member, a second eccentric carried by one of the toothed gears, a slider reciprocated by the second eccentric and having a rack thereon, a pinion rotatably mounted concentrically with the shaft and meshing with the rack and oscillated thereby through a fixed angle of oscillation and forming oscillating driving means for the windshield wipers and the like, and means for selectively securing the other toothed gears against rotation to selectively cause the same to react against the member to control the same and hence control the speed of rotation of said one gear and the speed of oscillation of the driving means, electrical means for starting and stopping the electric motor and including normally closed switch means for maintaining the electric motor in operation, and means on the slider engaging the switch means for opening the same when the slider reaches an end position for continuing motor operation until the oscillating driving means is oscillated to one end of the fixed angle of oscillation and then stopping the motor.

14. A multiple speed driving mechanism for windshield wipers and the like comprising, an electric motor, a shaft rotated by the motor, an eccentric secured to the shaft for rotation therewith, a member rotatably mounted on the eccentric and oscillated thereby and having at least three rings of gear teeth arranged thereon, at least three relatively rotatable toothed gears concentric with the shaft and meshing respectively with the rings of gear teeth on the member, motion transmitting means concentric with the shaft and connected to one of the toothed gears and including means for translating rotary motion of said toothed gear to oscillating motion through a fixed angle of oscillation and forming oscillating driving means for the windshield wipers and the like, and means for selectively securing the other toothed gears against rotation to selectively cause the other toothed gears to react against the member to control the same and hence control the speed of rotation of said one gear and the speed of oscillation of the driving means, electrical means for starting and stopping the electric motor and including normally closed switch means for maintaining the electric motor in operation, and means on the motion transmitting means for engaging the switch means for opening the same when the oscillating driving means is oscillated to an end position for continuing motor operation until the oscillating driving means is oscillated to one end of the fixed angle of oscillation and then stopping the motor.

15. A multiple speed driving mechanism for windshield wipers and the like comprising, an electric motor, a shaft rotated by the motor, a multiple speed differential gear speed reducer means concentric with the shaft and including an output member rotated at selected reduced speeds thereby, motion transmitting means concentric with the shaft and connected to the output member of the speed reducer means and including means for translating rotary motion of the speed reducer means to oscillatory motion through a fixed angle of oscillation and forming oscillating driving means for driving the windshield wipers and the like at selected speeds of operation, electrical means for starting and stopping the electrical motor and including normally closed switch means for maintaining the electric motor in operation, and means on the motion transmitting means for engaging the switch means for opening the same when the oscillating driving means is oscillated to an end position for continuing motor operation until the oscillating driving means is oscillated to one end of the fixed angle of oscillation and then stopping the motor.

16. A multiple speed driving mechanism for windshield wipers and the like comprising, an electric motor, a shaft rotated by the motor, an eccentric secured to the shaft for rotation therewith, a member rotatably mounted on the eccentric and oscillated thereby and having at least three rings of gear teeth arranged thereon, at least three relatively rotatable toothed gears concentric with the shaft and meshing respectively with the rings of gear teeth on the member, a second eccentric carried by one of the toothed gears, a slider reciprocated by the second eccentric and having a rack thereon, a pinion rotatably mounted concentrically with the shaft and meshing with the rack and oscillated thereby through a fixed angle of oscillation and forming oscillating driving means for the windshield wipers and the like, and means for selectively securing the other toothed gears against rotation to selectively cause the same to react against the member to control the same and hence control the speed of rotation of said one gear and the speed of oscillation of the driving means, electrical means for starting and stopping the electric motor and including normally closed switch means for maintaining the electric motor in operation, and means on the slider engaging the switch means for opening the same when the slider reaches an end position for continuing motor operation until the oscillating driving means is oscillated to one end of the fixed angle of oscillation and then stopping the motor, and manually operated means for shifting the switch means out of the path of movement of the slider and for continuously maintaining the switch means closed to maintain the motor in continuous operation.

17. A multiple speed driving mechanism for windshield wipers and the like comprising, an electric motor, a shaft rotated by the motor, an eccentric secured to the shaft for rotation therewith, a member rotatably mounted on the eccentric and oscillated thereby and having at least three rings of gear teeth arranged thereon, at least three relatively rotatable toothed gears concentric with the shaft and meshing respectively with the rings of gear teeth on the member, motion transmitting means concentric with the shaft and connected to one of the toothed gears and including means for translating rotary motion of said toothed gear to oscillating motion through a fixed angle of oscillation and forming oscillating driving means for the windshield wipers and the like, and means for selectively securing the other toothed gears against rotation to selectively cause the other toothed gears to react against the member to control the same and hence control the speed of rotation of said one gear and the speed of oscillation of the driving means, electrical means for starting and stopping the electric motor and including normally closed switch means for maintaining the electric motor in operation, and means on the motion transmitting means for engaging the switch means for opening the same when the oscillating driving means is oscillated to an end position for continuing motor operation until the oscillating driving means is oscillated to one end of the fixed angle of oscillation and then stopping the motor, and manually operated means for shifting the switch means out of the path of movement of the motion transmitting means and for continuously maintaining the switch means closed to maintain the motor in continuous operation.

18. A multiple speed driving mechanism for windshield wipers and the like comprising, an electric motor, a shaft rotated by the motor, a multiple speed differential gear speed reducer means concentric with the shaft and including an output member rotated at selected reduced speeds thereby, motion transmitting means concentric with the shaft and connected to the output member, the speed reducer means and including means for translating rotary motion of the speed reducer means to oscillatory motion through a fixed angle of oscillation and forming oscillating driving means for driving the windshield wipers and the like at selected speeds of operation, electrical means for starting and stopping the electric motor and including normally closed switch means for maintaining the electric motor in operation, and means on the motion transmitting means for engaging the switch means for opening the same when the oscillating driving means is oscillated to an end position for continuing motor operation until the oscillating driving means is oscillated to one end of the fixed angle of oscillation and then stopping the motor, and manually operated means for shifting the switch means out of the path of movement of the motion transmitting means and for continuously maintaining the switch means closed to maintain the motor in continuous operation.

19. A multiple speed driving mechanism for windshield wipers and the like comprising, an electric motor, a shaft rotated by the motor, an eccentric secured to the shaft for rotation therewith, a member rotatably mounted on the eccentric and oscillated thereby and having at least three rings of gear teeth arranged thereon, at least three relatively rotatable toothed gears concentric with the shaft and meshing respectively with the rings of gear teeth on the member, a second eccentric carried by one of the toothed gears, a slider reciprocated by the second eccentric and having a rack thereon, a pinion rotatably mounted concentrically with the shaft and meshing with the rack and oscillated thereby through a fixed angle of oscillation and forming oscillating driving means for the windshield wipers and the like, and means for selectively securing the other toothed gears against rotation to selectively cause the same to react against the member to control the same and hence control the speed of rotation of said one gear and the speed of oscillation of the driving means, electrical means for starting and stopping the electric motor and including normally closed switch means for maintaining the electric motor in operation, and means on the slider engaging the switch means for opening the same when the slider reaches an end position for continuing motor operation until the oscillating driving means is oscillated to one end of the fixed angle of oscillation and then stopping the motor, said means for selectively securing said other toothed gears including means for shifting the switch means out of the path of movement of the slider and for continuously maintaining the switch means closed to maintain the motor in continuous operation.

20. A multiple speed driving mechanism for windshield wipers and the like comprising, an electric motor, a shaft rotated by the motor, a multiple speed differential gear speed reducer means concentric with the shaft and including an output member rotated at selected reduced speeds thereby and means for selecting the reduced speed of operation of the output member, motion transmitting means concentric with the shaft and connected to the output member of the speed reducer means and including means for translating rotary motion of the speed reducer means to oscillatory motion through a fixed angle of oscillation and forming oscillating driving means for driving the windshield wipers and the like at selected speeds of operation, electrical means for starting and stopping the electric motor and including normally closed switch means for maintaining the electric motor in operation, and means on the motion transmitting means for engaging the switch means for opening the same when the oscillating driving means is oscillated to an end position for continuing motor operation until the oscillating driving means is oscillated to one end of the fixed angle of oscillation and then stopping the motor, said means for selecting the reduced speed of operation of the output member including means for shifting the switch means out of the path of movement of the motion transmitting means and for continuously maintaining the switch means closed to maintain the motor in continuous operation.

References Cited in the file of this patent

UNITED STATES PATENTS

| | | |
|---|---|---|
| 1,808,539 | Gessner | June 2, 1931 |
| 2,026,880 | Fliesberg | Jan. 7, 1936 |
| 2,132,951 | Hall | Oct. 11, 1938 |
| 2,256,055 | Probst | Sept. 16, 1941 |
| 2,484,781 | Coffey | Oct. 11, 1949 |
| 2,666,345 | Amberg | Jan. 19, 1954 |
| 2,830,458 | Sundt | Apr. 15, 1958 |